R. C. GALLETTI.
PRODUCTION OF CONTINUOUS WAVE TRAINS BY MEANS OF PRIMARY SPARK CIRCUITS.
APPLICATION FILED JUNE 24, 1910.

1,000,397.

Patented Aug. 15, 1911

2 SHEETS—SHEET 1.

Witnesses
M. H. Day.
R. A. Bakersmith

Inventor
Roberto C. Galletti,
By Wm. E. Boulter.
Attorney

R. C. GALLETTI.
PRODUCTION OF CONTINUOUS WAVE TRAINS BY MEANS OF PRIMARY SPARK CIRCUITS.
APPLICATION FILED JUNE 24, 1910.
1,000,397.
Patented Aug. 15, 1911.
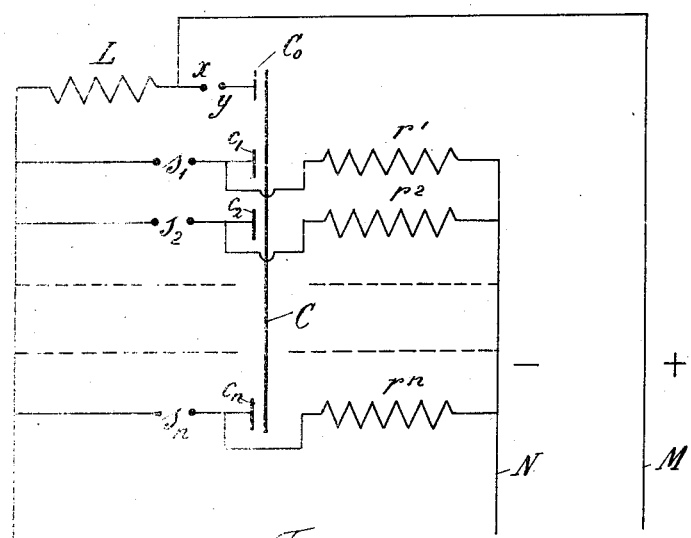
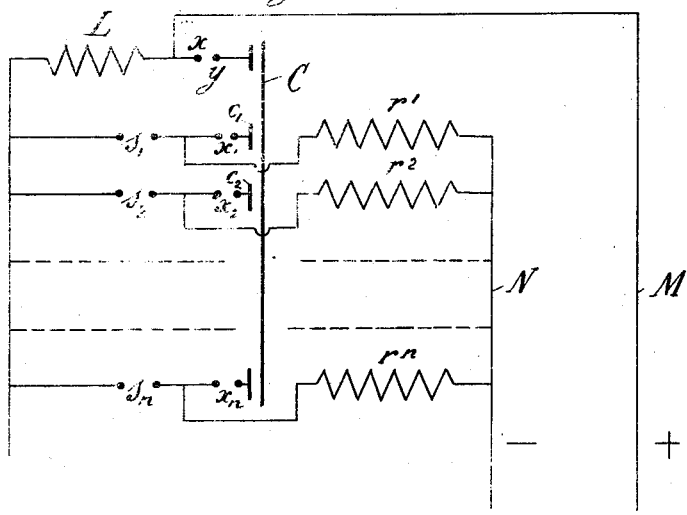

UNITED STATES PATENT OFFICE.

ROBERTO CLEMENS GALLETTI, OF LYON, FRANCE.

PRODUCTION OF CONTINUOUS WAVE-TRAINS BY MEANS OF PRIMARY SPARK-CIRCUITS.

1,000,397.  Specification of Letters Patent.  Patented Aug. 15, 1911.

Application filed June 24, 1910. Serial No. 568,706.

*To all whom it may concern:*

Be it known that I, ROBERTO C. GALLETTI, a subject of the King of Italy, residing at Lyon, in France, have invented certain new and useful Improvements in the Production of Continuous Wave-Trains by Means of Primary Spark-Circuits, of which the following is a full, clear, and exact description.

This invention relates to an apparatus for producing permanent continuous wave trains by means of primary spark discharges.

The chief feature of the invention consists in the said spark discharges being produced quickly or continuously following each other.

Figure 1:
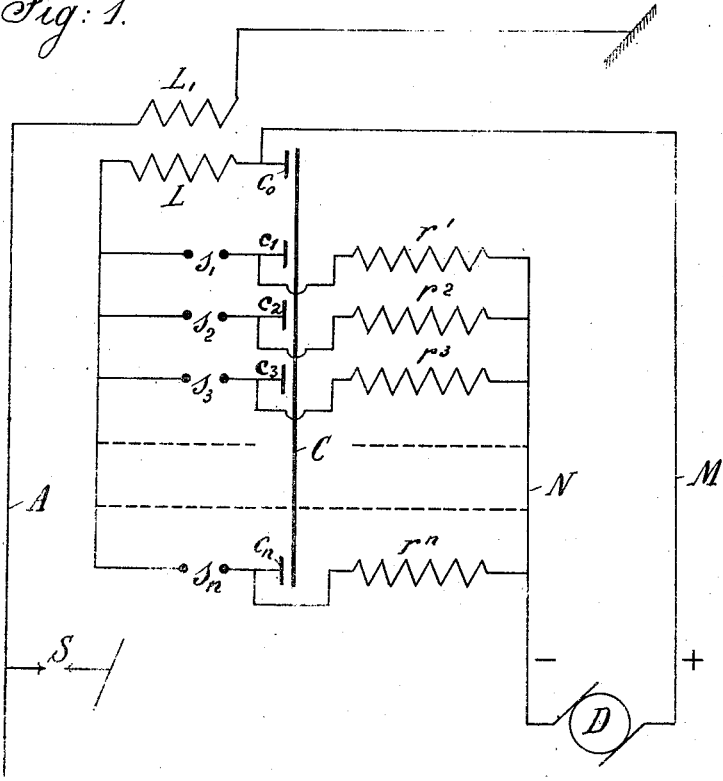
Figure 2:
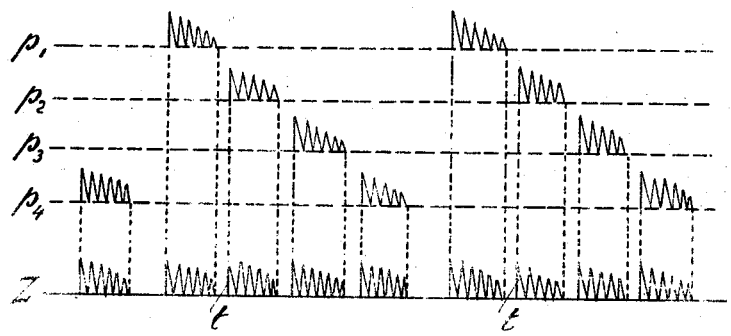

In the drawings: Figures 1, 3 and 4 show, diagrammatically, apparatus for carrying out the invention. Fig. 2 shows a representation of the action of my apparatus.

In Fig. 1 I show how a series of primary sparks can influence an aerial conductor or antenna provided in a secondary circuit and intended to emit in space the oscillation energy produced by the sparks. The device is constituted by a number of condensers of equal capacities, $c_1, c_2, c_3 \ldots c_n$ and by a condenser $c_0$ which can be equal to the preceding ones, or different therefrom. All these condensers have one and the same armature C. A coil L forming the primary of an induction coil is connected at one end to the individual armature of the condenser $c_0$ to which is also connected the lead M of the high tension continuous current machine D, and the other end of the coil L is connected by means of spark gaps $s_1, s_2, s_3 \ldots s_n$ to the condensers $c_1, c_2, c_3 \ldots c_n$, and the latter are connected by equal resistances $r', r^2, r^3 \ldots r^n$, and the lead N to the other pole of the dynamo. The secondary oscillation circuit consists of an earthed, aerial conductor or antenna A and of a coil $L_1$ wound about the coil L, the coil $L_1$ being influenced by all oscillations produced in the primary oscillation circuits. These primary circuits are constituted by condenser $c_0$, coil L, spark gap $s_1$ and condenser $c_1$; condenser $c_0$, coil L, spark gap $s_2$ and condenser $c_2$; condenser $c_0$, coil L, spark gap $s_3$ and condenser $c_3$; .... condenser $c_0$, coil L, spark gap $s_n$ and condenser $c_n$. The spark gap S arranged at any point between the aerial conductor and the earth makes it possible to watch the succession of single wave trains produced in the secondary circuit by the primary sparks, as each induced wave train produces a spark at S. If each spark gap $s_1, s_2 \ldots s_n$ is considered separately, it will be found that the frequency of the sparks for each gap is a determinate one. This frequency is indicated by the height of the note which the sparks produce, and is a function of the virtual lengths of the spark gaps, of the size of the resistances, of the capacity, of the damping coefficient of the oscillation circuit, etc. All these factors are, as far as possible, equal for each spark gap, and the capacity $c_0$ can also be equal to the capacities $c_1, c_2, c_3 \ldots c_n$, or be different therefrom. The resistances $r', r^2, r^3 \ldots r^n$ are preferably made inductive, in order to avoid strong fluctuations of current and in order to protect the dynamo from oscillations. It has been found that when in this device, $c_0$ is not made excessively large compared to $c_1 c_2 \ldots c_n$, the discharges take place successively in all the spark gaps. The sequence of the primary sparks is automatically determined and the cycle of these discharges begins afresh, endlessly, at regular time intervals, so that the secondary wave trains in the aerial conductor A, follow each other at given time intervals which are a multiple of the frequency of the discharges in each spark gap, and of the number of spark gaps. This can be proved by taking at S a spark from the aerial conductor, the said spark gives a musical sound, the number of vibrations of which is equal to the product of the sound waves produced by each spark gap, by the number of the spark gaps. This result was observed from a low sound which corresponds to a few hundreds of sparks at S, up to the limit of audibility of high notes, and photographs of the spark gaps taken with a revolving mirror have shown regular sequences of equally spaced sparks of the order of 100,000 per second. The automatic, mutual influence of the consecutive sparks of the different gaps, which must take place in order to obtain the exactness in the sequence of the sparks required for producing a musical tone, is easily explained if it is taken into consideration that the potential difference at each spark gap $s_1$, $s_2$, etc., is the sum of the tension of $c_0$ and of the particular condenser connected to the said spark gap. If, now, a discharge takes place at $s_3$, the tension at the condenser $c_0$ is thereby reduced, and therefore the tensions are reduced at all the other spark gaps $s_1, s_2, s_3 \ldots s_n$ which therefore do not discharge so long as there is a spark at $s_3$, but as soon as the said spark ceases the condenser $c_0$, common to each capacity, $(c_0, c_1)$, $(c_0, c_2) \ldots (c_0, c_n)$, which are under charge respectively through the resistances $r' \ldots r^n$ from the lead N, returning through lead M, increases rapidly in tension and thus raises the potential of each of the spark gaps by a common increment, while only the current arriving through the resistance $r^3$ can charge the condenser $c_3$. All the condensers $c_1, c_2, c_4 \ldots c_n$ are already more or less charged but the condenser $c_3$ has been just now completely discharged. Thus all the gaps $s_1, s_2, s_4 \ldots s_n$ become operative consecutively before $s_3$ can again discharge and at the instants when the tension of $c_0$ is each time high enough to break down one of these gaps after the other. As now between two consecutive sparks in one and the same spark gap there must take place first a discharge at every one of the other gaps, it is clear that the discharges will take place in a regular sequence. These primary discharges induce in the secondary conductor wave trains as diagrammatically shown in Fig. 2 in which on a time axis Z are marked the wave trains by which four primary oscillation circuits $p_1, p_2, p_3, p_4$ influence a secondary circuit. Between the beginning and end of two consecutive primary wave trains of one cycle there may be a time interval $t$, or they may overlap each other in time; it is sufficient to obtain overlapping to make the number of sparks per second sufficiently great, and the damping coefficients of their circuits small. This time-overlapping of the primary wave trains can be avoided in practice by the use of wave trains following each other even at very short intervals provided that they quickly terminate, or conversely the number of sparks per time unit must be limited when they are of long duration, that is to say, their circuit of oscillation has a small damping coefficient.

If there is a time interval between the end of one spark and the beginning of the next or between the spark cycles they may be made contiguous in time by arranging a common spark gap, which modification is shown in Fig. 3. The spark gap $x$—$y$ is arranged between the individual plate of the condenser $c_0$ and the primary induction coil L which is connected to one pole of the dynamo. As long as discharges take place at any of the spark gaps $s_1, s_2 \ldots s_n$ the gap $x$—$y$ will also be in the path of discharge and can be assumed to be conducting. If no discharge takes place in this arrangement, the result will be that, although the resistance of the gap $x$—$y$ may be small compared to that of the gaps $s_1, s_2 \ldots s_n$, as quantities of static electricity accumulate at $x$ and connected electrodes, owing to the current which comes direct from the supply lead M, and as these quantities raise the small capacity of $x$, in a very short time to such a tension that a discharge must take place somewhere in the system, the latter does not take place over $x$—$y$ but over one of the gaps $s_1, s_2 \ldots s_n$. The reason of this is that the individual plate of the capacity $c_0$ and electrode $y$ are completely insulated from the other pole of the machine. This, of course, would not be the case for alternating current, the small gap $x$—$y$ would be bridged over before the gaps $s_1, s_2 \ldots s_n$, as with this kind of current electric quantities would be induced at $y$, due to condenser influence. It follows from the above that when such a common spark gap is used there can be no appreciable time interval between two primary wave trains, for when $x$—$y$ is not bridged over and would form a dielectric intermediate layer, this results in the isolation of a very small capacity at $x$ and connected electrodes, and the potential would be increased so fast that a discharge would be brought about in almost infinitesimal time by one of the spark gaps $s_1, s_2 \ldots s_n$. This function of the gap $x$—$y$ can be proven experimentally by providing cyclic discharge of primary sparks of such number and duration that time intervals are produced between the single discharges, using for the purpose a device such as shown in Fig. 1, and then switching in such a gap $x$—$y$. By this intermediate switching there is at once obtained an increase in the discharge frequency which will be at once reflected at S and contiguity in time between the single wave trains will be effected; the sound produced in this way at the spark at $x$—$y$ has the same pitch as the spark S (placed in the secondary, as previously described in connection with Fig. 1) which has shown the increased frequency of sparks upon the switching in of $x$—$y$. It is obvious that when the gap $x$—$y$ is to work as stated, its electrodes must be protected from overheating in order that the production of hot gases should not keep the gap permanently conducting. More particularly, when many primary oscillation circuits are used, which necessitate a great charging current, and where $x$—$y$ is exposed to very powerful oscillations which strongly heat the electrodes of the said gap, it is preferable to insert between the free plates or coatings of the capacities $c_1, c_2 \ldots c_n$ and their supply lead auxiliary spark gaps $x_1, x_2 \ldots x_n$ similar in action to $x-y$ (Fig. 4). As long as a primary spark lasts, its changing potential affects all the capacities and bridges all the gaps $x_1 \ldots x_n$, but as soon as this strong source of oscillation ceases, the gaps $x_1, x_2 \ldots x_n$ have the tendency to stop the supply of current to their capacities, this being chiefly the case for that capacity which is charged to the greatest extent, as its charging current is already automatically about to cease. The most highly charged capacity is, therefore, first insulated through $x_1, x_2$ or $x_n$, and therefore the discharge will also take place first through the large corresponding spark gap $s_1, s_2$ or $s_n$.

To sum up, the object of the spark cycles obtained by means of resistances and spark circuits connected in parallel in the fashion above described, is the production of unlimited quantities of oscillation energy without overheating the spark gaps and without losing much energy in the resistances. It follows from the foregoing that the primary sparks of a spark cycle, and the said cycles can be produced without time intervals, continuously following each other, so that in that way a continuous wave train is produced in the secondary conductor, which wave train is the more constant the smaller the damping in the secondary circuit. Whatever be the damping coefficient of the secondary circuit, for instance, the great damping of a powerful aerial conductor capable of giving off at once all the energy of each primary spark, it is sufficient for wireless telephony that the spark periods in each circuit and the sequence of the said circuits should be above the audible notes.

Practical advantages can be obtained in wireless telegraphy when the spark discharges of a cycle are rendered continuous, and time intervals are left between the cycles. In that way, groups of practically constant wave trains are produced in the secondary conductor. This result can be obtained by suitable selection of the several electric constants of the above circuits, notably the value of $c_0$.

What I claim is:

1. An oscillatory system of circuits comprising in combination a plurality of spark gap circuits having a common inductance, a common condenser, and each a separate condenser with an armature in common with the common condenser, and means whereby the resulting capacities of each spark gap circuit may be charged.

2. An oscillatory system of circuits comprising in combination a plurality of spark gap circuits having a common inductance, a common condenser, and each a separate condenser with an armature in common with the common condenser, and means whereby the resulting capacities of each spark gap circuit may be charged through a separate impedance from a common source of direct current.

3. An oscillatory system of circuits comprising in combination a plurality of spark gap circuits having a common inductance, a common condenser, and each a separate condenser with an armature in common with the common condenser, and means whereby the resulting capacities of each spark gap circuit may be charged through a separate impedance from a common source of direct current and whereby the common condenser may be charged through all the separate condensers in parallel and through all these separate impedances in parallel respectively.

4. A secondary circuit and a primary oscillatory system of circuits comprising in combination a plurality of spark gap circuits having a common inductance, a common condenser, and each a separate condenser with an armature in common with the common condenser, and means whereby the resulting capacities of each spark gap circuit may be charged.

5. A device for producing continuous wave trains consisting of a secondary and a system of primary spark gap circuits comprising a plurality of condensers, a common armature for all said condensers, a source of direct current, to one pole of which one condenser is connected by its individual armature and to the other pole of which all the other condensers are connected by their individual armatures by means of equal impedances, and an oscillatory transformer having its primary connected to the common condenser, spark gaps arranged between the common condenser and each of the other condensers whereby the common condenser and the primary of the transformer participate in all the oscillations of each of the primary spark gap circuits and influence the secondary of the oscillatory transformer.

6. A device for producing continuous wave trains consisting of a secondary and a system of primary spark gap circuits comprising a plurality of condensers, a common armature for all said condensers, a source of direct current, to one pole of which one condenser is connected by its individual armature and to the other pole of which all the other condensers are connected by their individual armatures by means of equal impedances, and an oscillatory transformer having its primary connected to the common condenser, spark gaps arranged between the common condenser and each of the other condensers whereby the common condenser and the primary of the transformer participate in all the oscillations of each of the primary spark gap circuits and influence the secondary of the oscillatory transformer, and auxiliary spark gaps between the individual armatures of each of the plurality of condensers and the points of connection of the same with the source of current.

In testimony whereof I have signed my name to this specification in the presence of two subscribing witnesses.

ROBERTO CLEMENS GALLETTI.

Witnesses:
 MARIN VACHON,
 ANNA DE MESSIMY.